United States Patent [19]
Boulanger

[11] Patent Number: 5,728,950
[45] Date of Patent: Mar. 17, 1998

[54] FLUID FLOWMETER

[75] Inventor: Michael P. Boulanger, Pelham, N.H.

[73] Assignee: Ametek Aerospace Products, Inc., Wilmington, Mass.

[21] Appl. No.: 650,654

[22] Filed: May 20, 1996

[51] Int. Cl.$^6$ ........................................ G01F 1/05
[52] U.S. Cl. ........................................ 73/861.79
[58] Field of Search ..................... 73/861.79, 861.71, 73/861.353

[56] References Cited

U.S. PATENT DOCUMENTS

| | | | |
|---|---|---|---|
| 3,877,304 | 4/1975 | Vetsch | 73/231 M |
| 4,012,957 | 3/1977 | Chiles et al. | 73/231 R |
| 4,241,613 | 12/1980 | Bradham, III | 73/861.71 |
| 4,291,584 | 9/1981 | Anderson | 73/861 |
| 5,370,001 | 12/1994 | LeBrecque et al. | 73/861.353 |

OTHER PUBLICATIONS

Sales Brochure for Mass Fuel Flowmeter 8TJ124 Series from AMETEK AEROSPACE PRODUCTS, INC.

*Primary Examiner*—Elizabeth L. Dougherty
*Assistant Examiner*—Jewel Artis
*Attorney, Agent, or Firm*—Hayes, Soloway, Hennessey, Grossman & Hage, P.C.

[57] ABSTRACT

A fluid flowmeter includes a turbine for imparting an angular momentum to a main flow of fluid related to a flow of fluid through the turbine. The flowmeter also includes an impeller for undergoing an angular deflection in response to the angular momentum of the main flow, which angular deflection is indicative of flowrate of the main flow. A poppet valve is provided for opening substantially as a function of pressure of the main flow to provide a bypass flow of fluid. The flow of fluid through the turbine is at most equal to the main flow reduced by the bypass flow. The valve is adapted such that the bypass flow varies so as to ensure that the flow through the turbine maintains substantially constant rotational speed of the turbine independent of flowrate of the main flow.

24 Claims, 9 Drawing Sheets

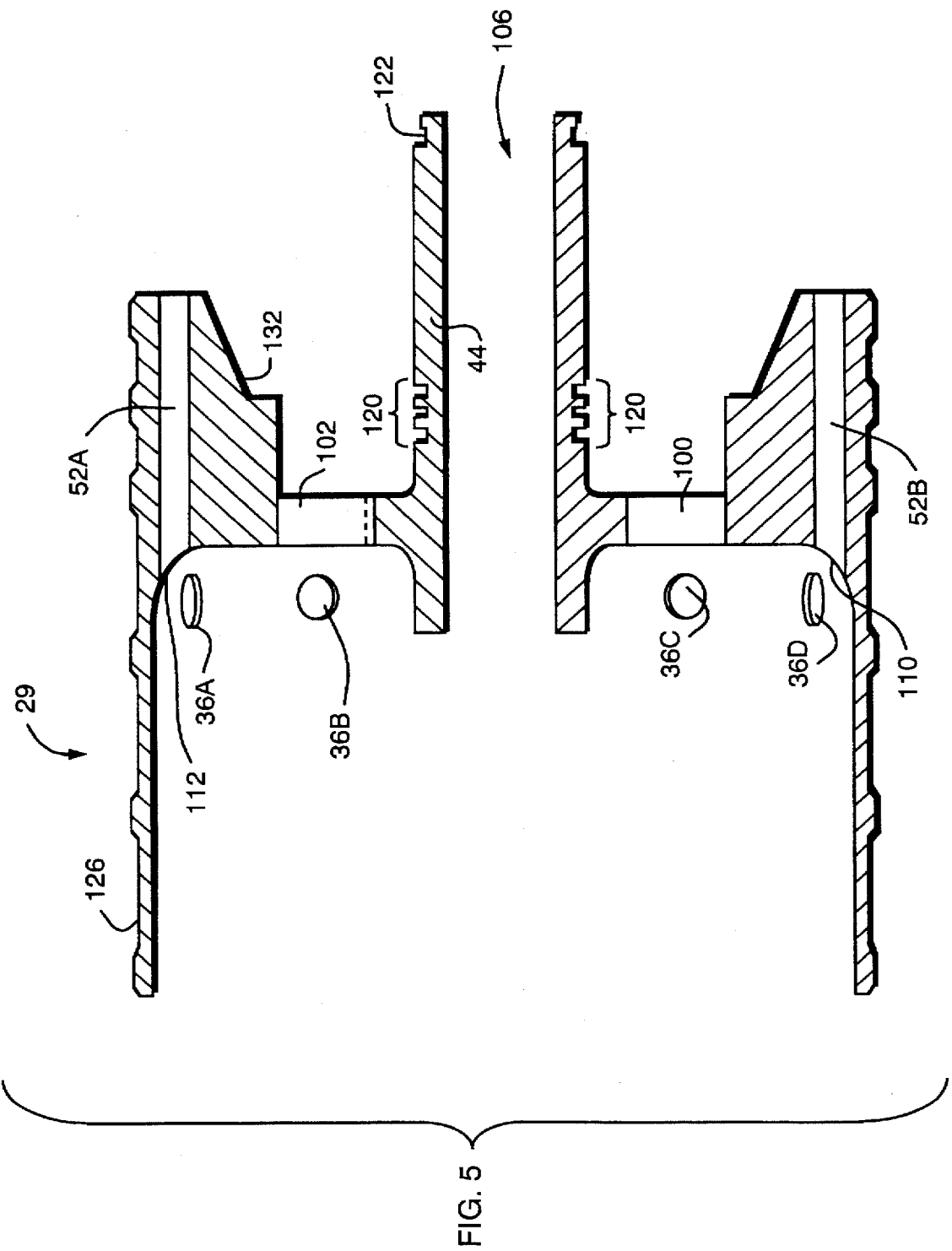

FLUID FLOWMETER

BACKGROUND OF THE INVENTION

1. Field of the Invention

The present invention relates generally to a fluid flowmeter, and more specifically, to an angular momentum-type fluid flowmeter having an improved fluid drive system for imparting the angular momentum to the fluid whose florate is to be measured by the flowmeter. Particular utility for the present invention is found in the area of measuring of fuel mass-flowrate in aircraft engines, and will be described in connection with such utility, although other utilities are contemplated, including other fluid flowrate measurement and regulation applications.

2. Brief Description of Related Prior Art

The prior art is replete with electronic and electromechanical systems for measuring fuel flowrate in liquid fuel combustion systems. Aircraft engines commonly use angular momentum-type flowmeters to make such measurements. In such systems, a flow of liquid fuel has an angular momentum imparted to it, a spring-restrained member located in the path of the fluid flow undergoes an angular deflection substantially proportional to the flowrate of the fuel, the angular deflection of the member is measured, and the flowrate of the fluid is determined based upon the measured angular deflection. In many such systems, a highly accurate motor drive assembly is required for imparting the angular momentum to the fuel.

In other systems, the moving fuel is used for driving a turbine which then drives a measurement assembly. In one typical type of motorless mass flowmeter, a turbine located in the path of the moving fluid is driven by the fluid. The turbine moves an impeller which is resiliently coupled thereto. The angular displacement of the impeller is then used to provide the desired data regarding the mass of fuel flowing through the system.

Unfortunately, in this conventional motorless angular momentum-type flowmeter, the rotational speed of the turbine and impeller is not constant over widely varying fuel flowrates. Disadvantageously, this can cause the angular displacement of the impeller to not be truly indicative of fuel mass flowrate at said widely varying flowrates.

Various attempts to solve this problem are disclosed in the prior art. For example, U.S. Pat. No. 3,877,304 to Vetsch discloses a fluid flowmeter which uses the force of the moving fluid to drive the measurement assembly. The flowmeter uses a leaf spring bypass valve system for controlling flow of fluid through a vaned turbine for driving the measurement assembly so as to keep rotational speed of the turbine substantially constant over varying fuel flowrates. Concerning this leaf spring bypass valve system Vetsch discloses "At low flow rates the leaves 115A substantially prevent the passage of fuel through holes 112B. As flow rate increases the leaves are deflected and thus part of the fuel bypasses the turbine blades 112A and flows through the holes 112B. In this way, the turbine is made to operate at a substantially constant speed over a wide range of flow rates." (Vetsch, column 3, lines 9–15).

Another prior art attempt to solve this problem is disclosed in U.S. Pat. No. 4,012,957 to Chiles et al. Chiles et al. discloses an improvement of the flowmeter disclosed in Vetsch. Specifically, Chiles et al. discloses a flowmeter of the type disclosed in Vetsch, but including a shroud assembly utilized upstream of the turbine for minimizing fluid leakage around the periphery of the turbine in order to achieve low fluid flowrate operation while avoiding stoppage of the turbine due to lodging of fluid contaminants. The shroud comprises a hollow member rotatable with the turbine, and has a first end secured to the turbine in a fluid-tight seal at points radially outward from the turbine drive apertures. The shroud also tapers to a second end proximate to the fluid inlet of the flowmeter, and forms a rotatable fluid seal with the sealing means surrounding the fluid inlet opening.

Yet another prior art attempt to solve the aforesaid problem involves flowing the fluid along helical grooves arranged circumferentially on a "swirler ball" to impart angular momentum to the fluid. The fluid is then used to drive a free-spinning vaned turbine to rotate the drive assembly. Leaf springs similar to those proposed in Vetsch and Chiles et al. are provided that seat on the grooves of the swirler ball at low flowrates to direct all of the flow through the grooves. As flow increases, a pressure drop across the leaf springs causes the leaf springs to deflect away from the swirler ball so as to generate a bypass flow in order to try to maintain nearly constant turbine rotational velocity over the expected operating flowrate of the flowmeter. Similar ball type flowmeters are available commercially from Ametek Aerospace Products, Inc. Wilmington, Mass., as well as several other vendors.

Unfortunately, none of the aforesaid three prior art techniques to solve the aforesaid problem is able to make the rotational speed of the turbine constant over a wide flow range, especially at very low flowrates (e.g. less than 1000 pph). Additionally, each of the aforesaid three prior art techniques involves using turbines having vaned passages, which type of turbine angular momentum from the fluid to the drive assembly due to the friction, drag, and/or vane imperfections associated with such turbines.

Another prior art flowmeter is disclosed in U.S. Pat. No. 4,291,584 to Anderson. Unfortunately, this flowmeter also suffers from the aforesaid and/or other disadvantages and drawbacks associated with the other prior art flowmeters discussed above.

SUMMARY OF THE INVENTION

Accordingly, the present invention provides a fluid flowmeter having an improved fluid drive system that overcomes the aforesaid and other disadvantages and drawbacks of the prior art. One embodiment of the flowmeter of the present invention essentially comprises a turbine for imparting an angular momentum to a main flow of fluid related to a flow of fluid through the turbine. The flowmeter also includes an impeller for undergoing an angular deflection in response to the angular momentum of the main flow, which angular deflection is indicative of flowrate of the main flow. A poppet valve is provided for opening substantially as a function of pressure of the main flow to provide a bypass flow of fluid. The flow of fluid through the turbine is at most equal to the main flow reduced by the bypass flow. The valve is adapted such that the bypass flow varies so as to ensure that the flow through the turbine maintains substantially constant rotational speed of the turbine independent of flowrate of the main flow.

Another embodiment of the flowmeter of the present invention includes an impeller for undergoing an angular deflection in response to a flow of fluid having angular momentum in related to the flowrate of fluid in the passages between the impeller and the shroud. A cylindrical member is attached to the viscous shroud and has one or more orifices for producing respective flows of fluid in a direction tangential to a circumference of the cylindrical member so as to impart rotation to the cylindrical member and shroud. The rotation of the cylindrical member and shroud imparts the angular momentum to the flow of fluid in said passage for deflecting the impeller.

Advantageously, the flowmeter of the present invention is significantly more compact, lightweight, and less complex than the prior art flowmeters discussed above. Additionally, the popper valve provides for precise control of bypass flow and concurrently flow through the orifices such that rotational speed of the turbine of the flowmeter of the present invention is substantially constant over a very wide range of flowrates, including at very low flowrates (e.g., less than one thousand PPH). Furthermore, the flowmeter of the present invention does not require a turbine having vaned passages, and thus, is not subject to the disadvantages and drawbacks associated with use of such vaned turbines in the aforesaid prior art flowmeters.

These and other advantages, aims, and objectives of the present invention will become apparent as the following Detailed Description proceeds, and upon reference to the Drawings, wherein like numbers depict like parts, and wherein:

BRIEF DESCRIPTION OF THE DRAWINGS

FIG. 5 is a longitudinal cross-sectional view of the shroud of the preferred embodiment of FIG. 1.

Figure 1:
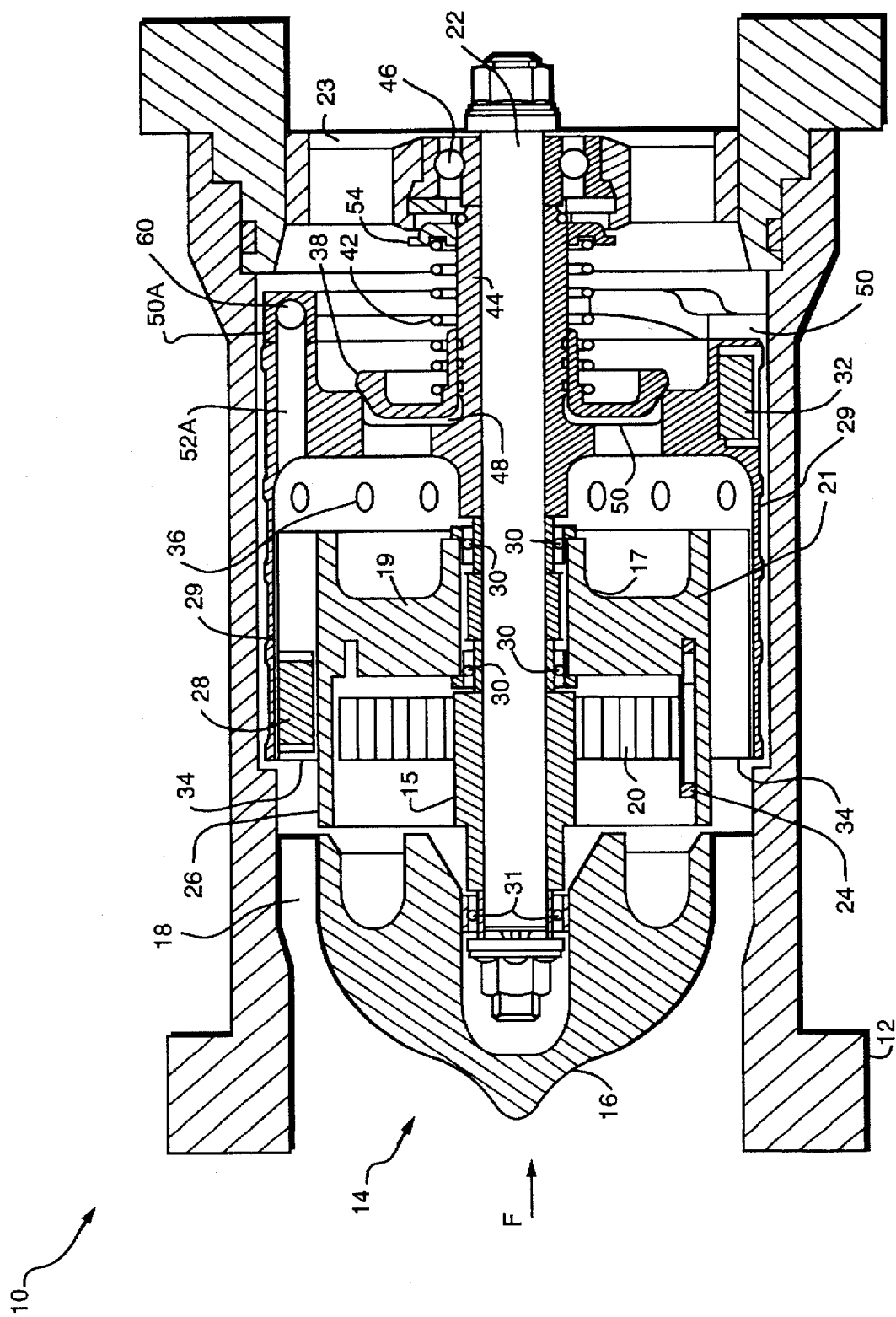
FIG. 1 is a longitudinal cross-sectional schematic diagram of one preferred embodiment of the flowmeter of the present invention.
Figure 2:
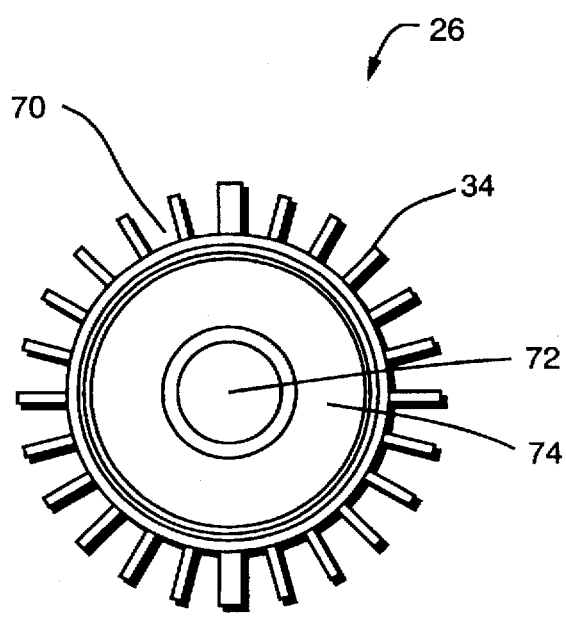
FIG. 2 is a front view of the impeller of the preferred embodiment of FIG. 1.
Figure 3:
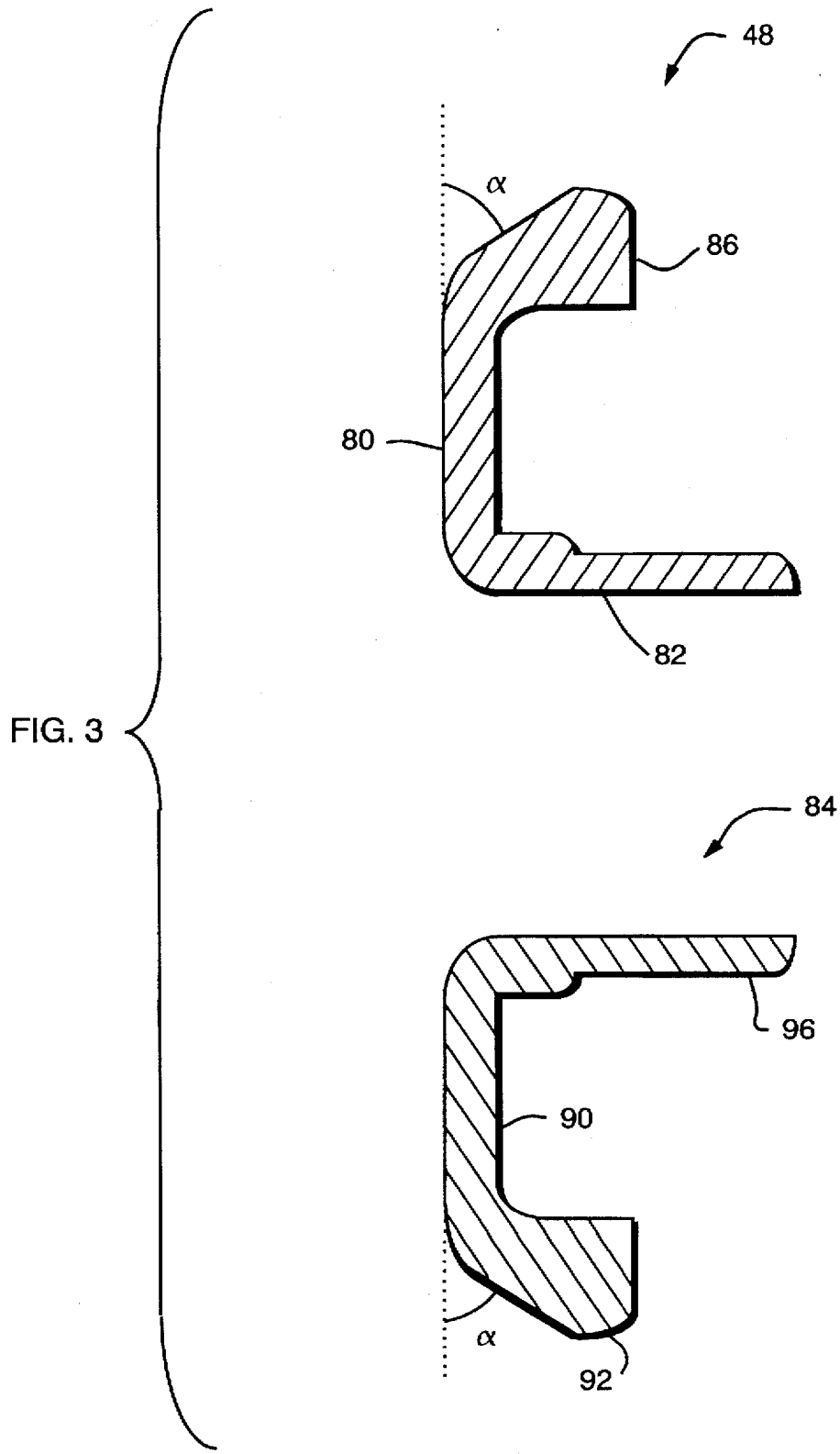
FIG. 3 is a longitudinal cross-sectional view of the annular valve member of the preferred embodiment of FIG. 1.
Figure 4:
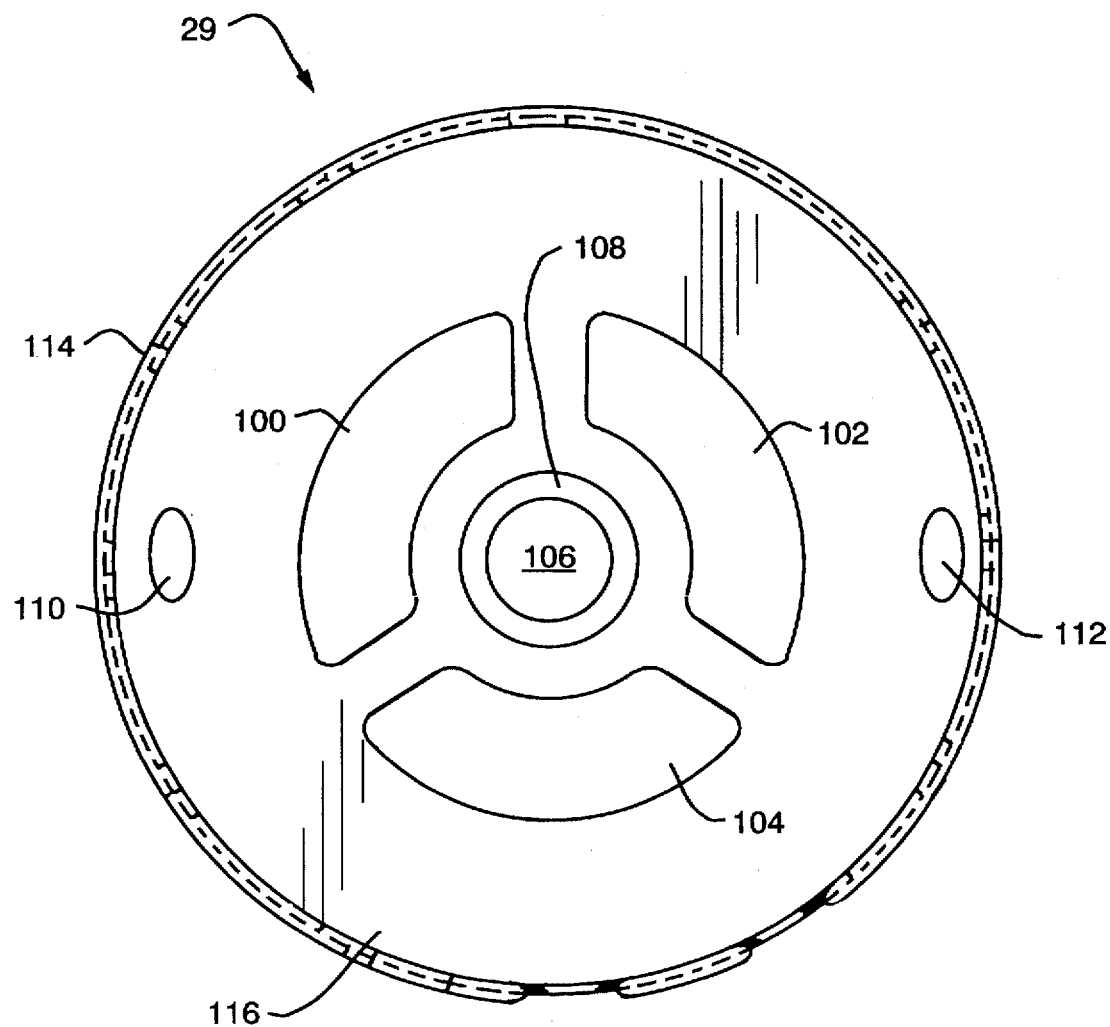
FIG. 4 is a front view of the shroud of the preferred embodiment of FIG. 1.
Figure 6A:
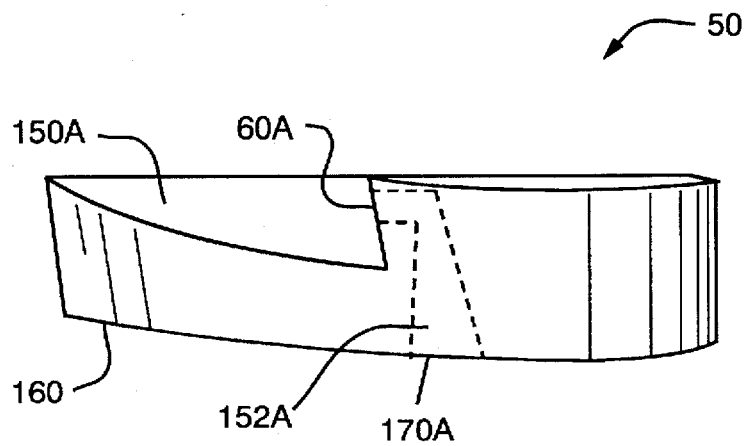
FIGS. 6A and 6B are opposite side views of the turbine of the embodiment of FIG. 1.
Figure 6B:
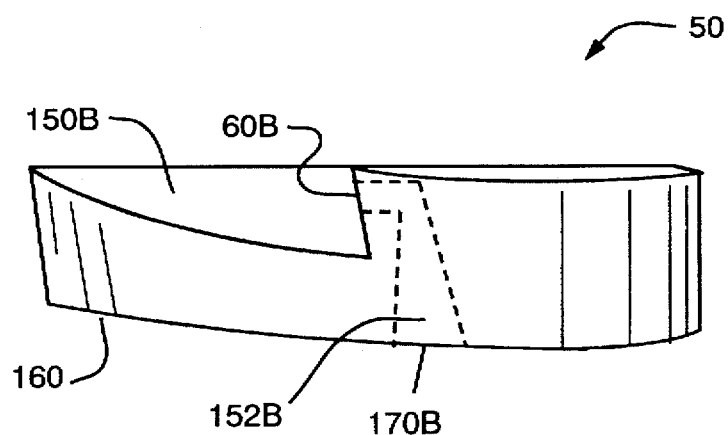
Figure 7:
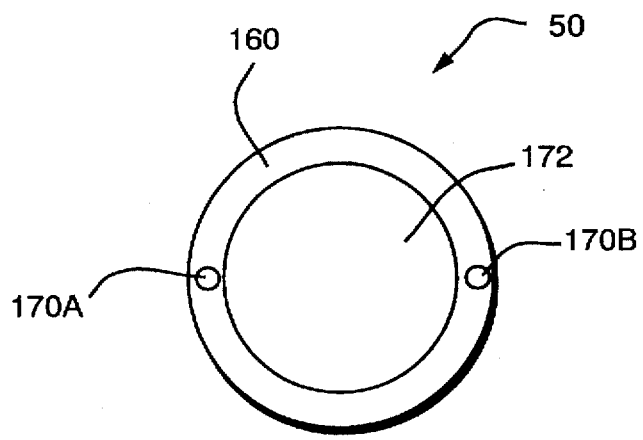
FIG. 7 is a plan view of the end of the turbine that is intended to be attached to the shroud of the embodiment of FIG. 1.

While the present invention will hereinafter be described in connection with a preferred embodiment thereof, and in connection with preferred methods of use (e.g., in connection with being used to measure liquid fuel flowrate from a pressurized fuel source to a combustor in an aircraft engine), it will be understood that it is not intended to limit the invention to this embodiment and these methods of use. For example, although the fluid drive system (comprising the turbine, shroud and poppet valve) of the system of the present invention will be described in connection with use in an angular momentum-type flowmeter, it should be appreciated that such drive system may be used in other applications. Thus, it is intended to cover all alternatives, modifications, and equivalents as may be included within the spirit and broad scope of the invention as only defined by the hereinafter appended claims.

DETAILED DESCRIPTION OF PREFERRED EMBODIMENTS

FIGS. 1–7 illustrate various components of one preferred embodiment 10 of the flowmeter of the present invention. Flowmeter 10 includes a generally cylindrical housing 12 made of metal and/or plastic having an inlet 14 for fluid flow (referred to by the letter "F"). A shaft 22 is rotatably mounted via ball bearing means 31,46 to a flow conditioner 16 and to strut assembly 23 (mounted or attached to housing 12 so as to be substantially coaxial with the housing 12), respectively. Assembly 23 includes openings (not shown) for permitting fluid entering the housing 12 via the inlet 14 to exit the housing 12 and to flow to a remote space (e.g., an engine combustion space, not shown).

Conical flow conditioner 16 is mounted to the shaft 22 adjacent the inlet 14. Flow conditioner 16 removes any swirling motion of flow F into the flowmeter 10, and directs the flow F through annular passage 18 and thence to impeller 26. Impeller 26 is made of metal or hard plastic and comprises a cylindrical portion 21 upon which is formed vanes 34, which vanes 34 are oriented parallel to the longitudinal axis of the impeller 26. Preferably, vanes 34 comprises 24 separate vanes spaced equally around the outer circumference of the cylindrical portion 70. A solid, circular portion 74 having a mounting opening 72 extends transversely from the cylindrical portion 21 to the cylindrical opening 72. The inner surface of the cylindrical portion 21 is attached to one end of a conventional restraining spring 20 via conventional means 24; the other end of the spring is rigidly mounted to the shaft 22 via a metallic mounting member 15. Preferably, spring 20 comprises at least 6.25 turns and is made of chromium and/or titanium containing metal. Shaft 22 extends through the opening 72 of the impeller 26, and impeller 26 is rotatably mounted to the shaft 22 via conventional ball bearing means 30 mounted to the inner surface of the opening 72. Preferably, impeller 26 is coaxial with the shaft 22.

Viscous shroud 29 surrounds impeller 26, is made of metal or hard plastic, and receives the fluid flow after it passes the impeller 26. Shroud 29 includes a cylindrical portion 114 and a circular portion 116 extending transversely from the inner surface of the cylindrical portion 114 to a central opening 106 through which the shah 22 is mounted so as to permit the shroud 29 to rotate. Cylindrical portion 114 includes a notched outer surface 126 which faces the inner surface of the housing 12. Circular portion 116 includes three trapezoidally shaped central orifices 100, 102, 104, and two oval openings 110, 112. As will be described more fully below, flow of fluid through the orifices 100, 102, 104 is controlled by poppet valve 38. Orifices 100, 102, 104 are preferably equally spaced around the center of the circular portion 1 16 of the shroud 29.

Oval openings 110, 112 are located on opposite sides of the outer circumference of the circular member 116. These openings 110, 112 permit fluid to flow from the interior of the shroud 29 to the turbine 50 via channels 52A, 52B.

Cylindrical portion 114 also includes a plurality of orifices, four of which 36A ... 36D are shown, equally spaced around the circumference of the cylindrical portion 114. These orifices 36A ... 36D are adapted to cause a fluidic pressure drop to occur across the fluid drive of the flowmeter and not across the impeller. Additionally, the orifices 36A ... 36D cause the pressure build up that would otherwise occur in the gap between the outer surface 126 of the shroud and the housing 12 to occur at the pressure relief holes 36A ... 36D which are downstream of the impeller. These phenomena cause the leakage flow through the gap between the outer surface 126 and the housing to be substantially proportional to the total flow over the operating flow range of the flowmeter, thereby increasing the flowrate measurement accuracy of the flowmeter.

Shroud 29 also includes cylindrical hub portion 44 through which central opening 106 extends. Popper valve 38 includes an annular valve member 48 having an annular front surface 80 and a cylindrical inner surface 82 which slides along the hub 44. Valve 38 also includes compression spring 42 which is attached at one end to back stop means 54, has its other end in contact with the back surface 90 of the annular member 48, and is biased to urge the annular front surface 80 of the annular member 48 against the back of the circular portion 116 of the shroud so as to block the orifices 100, 102, 104. Back stop means 54 is rigidly mounted to the shaft 22 by conventional means (e.g., a retaining ring rigidly mounted in the circumferential notch 122 of the hub 44) so as to famish a fixed place to which to attach the spring 42 so that the spring 42 may apply its compressive force to the annular member 48. One or more washers are added between the retaining ring and back stop means 54 which compresses spring 42, thus increasing the compressive force to annular member 48. By adjusting the compressive force to annular member 48, the opening of poppet valve 38 can be effectively set for the operating flow range of a specific flowmeter. Preferably, the annular member 48 also includes a raised lip portion 92 which is at an angle of 60 degrees from the planar front surface 80. The spring 42 is wound around the outside surface of cylindrical portion 96 of the annular member 48.

Hub 44 also includes a plurality (preferably, three) circumferential notches (referenced to collectively by numeral 120) formed in the area of the hub 44 on which the inner surface 82 of the cylindrical portion 96 of the annular member 48 slides. Advantageously, grooves 120 trap fluid contaminant particles from the fluid flow when the annular member 48 slides along the hub 44 so as to avoid wedging and/or binding of the annular member 48 to the shroud hub 44. Contaminant particles are flushed out of grooves 120 and therefore do not accumulate as annular member 48 slides along hub 44 and exposes grooves 120 to fresh fluid flow. This helps to ensure proper operation of poppet valve 38.

Fluid passing through orifices 100, 102, 104 passes through the openings in the strut assembly 23 which admit fluid flow into the combustor. Fluid flow passing through the openings 110, 112 is admitted to channels 52B, 52A, respectively, and thence, flows into openings 170A, 170B, respectively of turbine 50. Annular turbine 50 is made of metal and/or hard plastic and is rigidly mounted at end 160 to shroud 29. Fluid flows from openings 170A, 170B into channels 152A, 152B, respectively, of the turbine, and thence, exits the turbine 50 via torque-generating orifices 60A, 60B, respectively, which are formed on opposite sides of the circumference of the annular turbine 50. Orifices 60A, 60B are formed so that the fluid flows exiting the turbine therethrough are substantially tangential to the circumference of the turbine 50, and are opposite in direction to each other. These tangential fluid flows exiting the turbine impart torque to the turbine 50 and to the shroud 29 rigidly connected thereto that is proportional to the flowrate of the fluid through the openings 60A, 60B. The torque thus imparted to the turbine 50 and shroud 29 causes the turbine and shroud to rotate and imparts angular momentum to the fluid flow F entering the impeller 26 that is related to the mass flowrate of the fluid. This causes the impeller 26 to undergo a deflection that is related to the angular momentum of the fluid, and thus, also related to the mass flowrate of the fluid.

In operation of flowmeter 10, the fluid flow enters the inlet 14, is straightened by the flow conditioner 16 and flows past the impeller. The fluid flow then passes through the openings 110, 112 of the shroud 30 and enters the passages 152A, 152B of the turbine. The flow then exits the turbine through orifices 60A, 60B and causes the turbine 50 and shroud 29 to rotate. This imparts angular momentum to the fluid, thereby causing the impeller to be deflected, in the manner described previously. Conventional RVDT or variable reluctance means 28, 32 are then used to detect the relative deflection of the impeller, which deflection is then used by a conventional flow indication means to determine the mass flowrate of the fluid through the flowmeter 10.

Regulation of rotational speed of the turbine and shroud is provided in flowmeter 10 by the poppet relief valve system 38. Spring 42 is adapted to cause the annular member 48 to remain seated against the orifices 100, 102, 104 at low flowrates (e.g., less than about 200 pph) of fluid through the shroud 29. This causes substantially all of the fluid in the shroud to exit the shroud through the orifices 110, 112 into the turbine 50, so as to maximize the torque generated by the turbine. As the flowrate of the fluid increases, the pressure of the fluid behind in the shroud 29 increases as a function of the flowrate of the fluid. When the axial force applied to the annular member 48 exceeds the preload of the spring 42 (e.g., about 1.2 lb-f), the annular member 48 moves toward the back stop 54, thereby opening the poppet valve 38. This generates a bypass flow of fluid through the orifices 100, 102, 104 to the strut 23, and thence, to the engine combustion space. The spring 42 is adapted to permit the annular member 48 to open substantially as a function of the pressure (and thus also of the flowrate) of fluid in the shroud 29, so as to generate additional bypass flow (thereby regulating the flowrate of fluid to the turbine) in a manner that maintains essentially constant rotational speed of the turbine and shroud assembly over widely varying flowrates of fluid through the flowmeter. Preferably, the popper valve 38 is adapted to create a flow area of fluid through the orifices 100, 102, 104 that enlarges substantially at a constant rate in proportion to increasing fluid pressure in the shroud.

EXAMPLE

Figure 8:
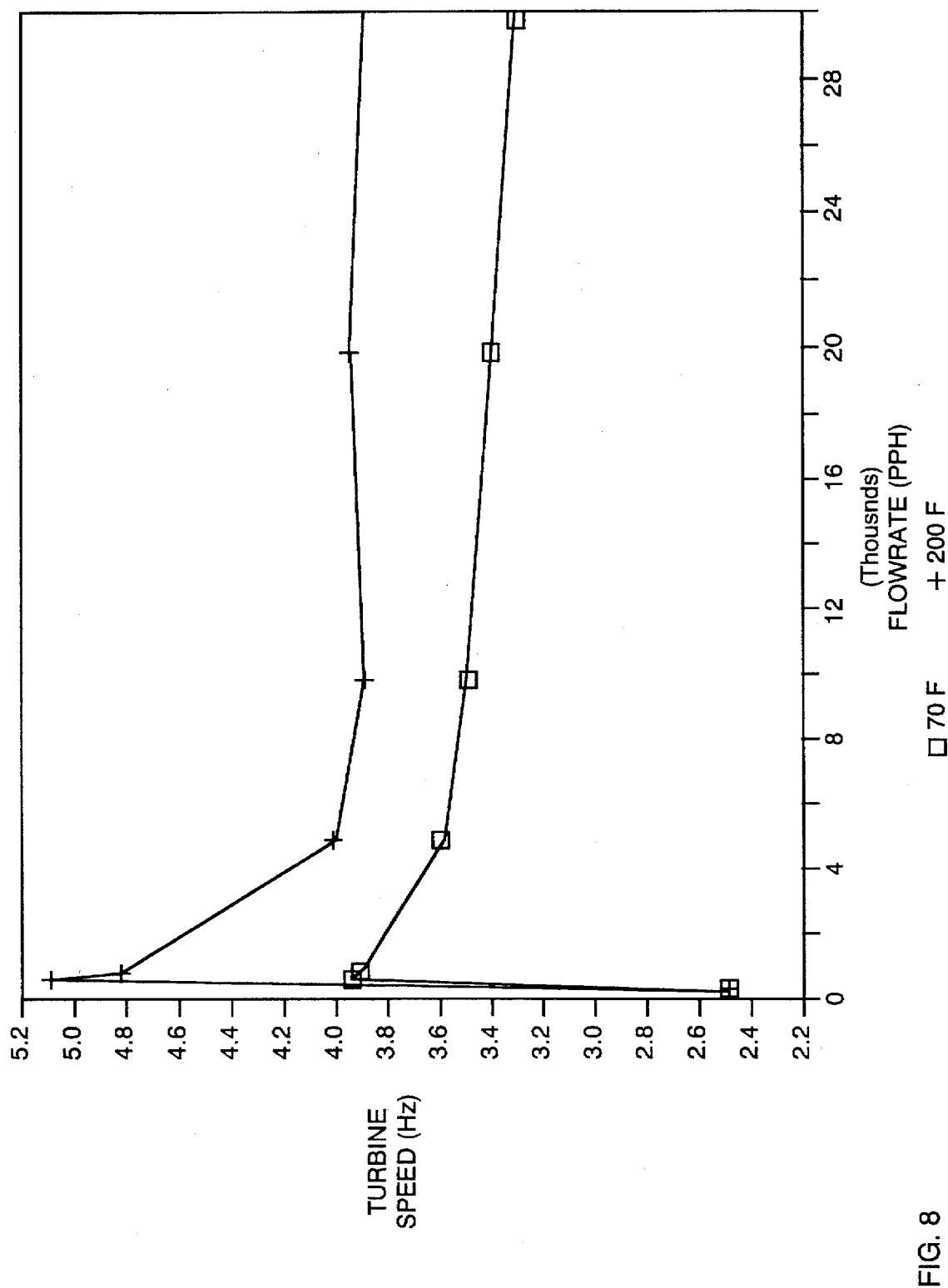
FIG. 8 are plots of experimental data illustrating turbine rotational speed vs. fluid flowrate characteristics of a conventional "swirler ball" type flowmeter of the type discussed previously.
Figure 9:
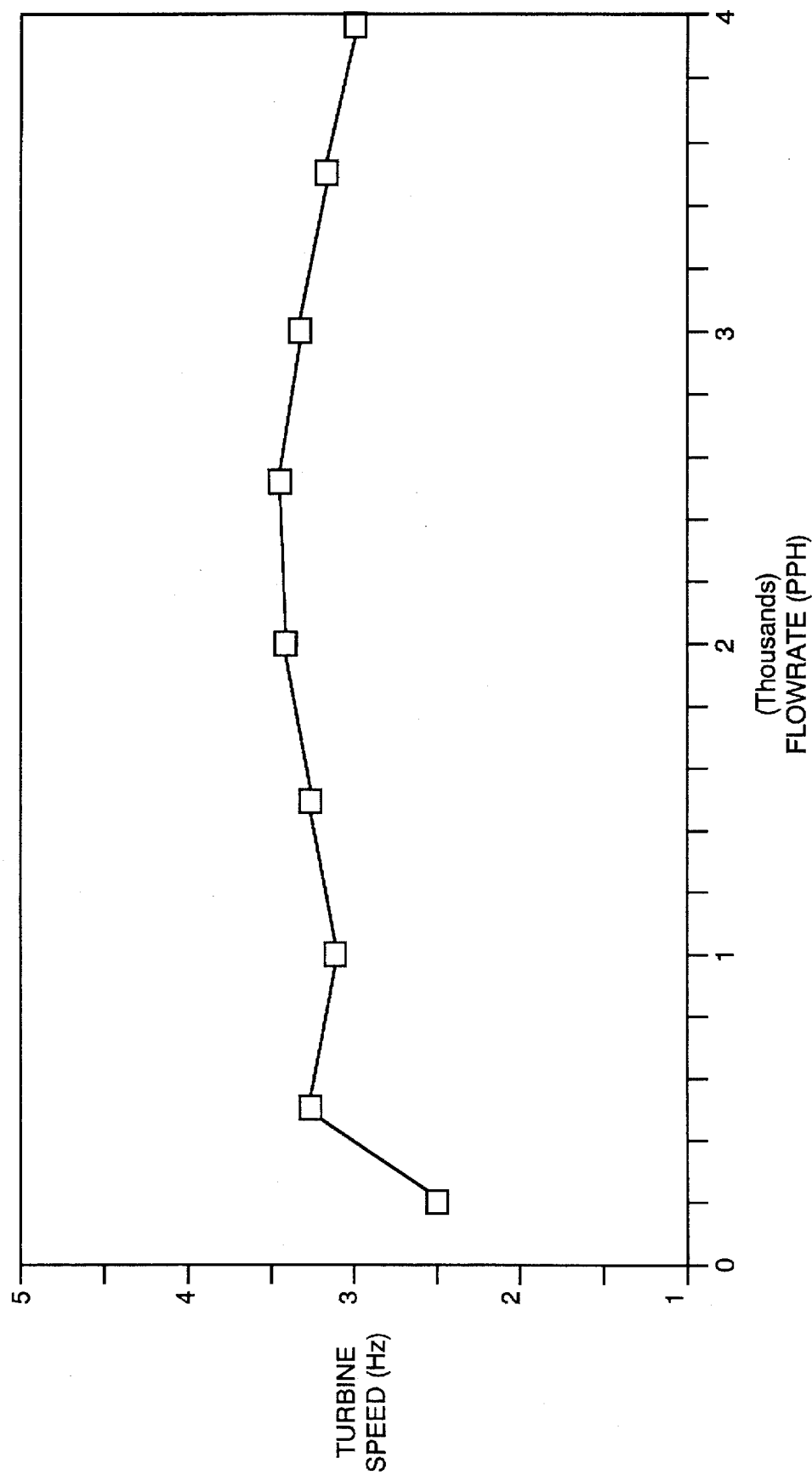
FIG. 9 is a plot of experimental data illustrating the turbine rotational speed vs. fluid flowrate characteristics of a flowmeter according to the embodiment of FIG. 1.

In order to demonstrate the uniquely advantageous nature of the present invention, a flowmeter 10 as shown in FIG. 1 was constructed, and compared to a conventional flowmeter of the type in which angular momentum is imparted to the fluid flow by a swirler ball, Model No. 8TJ124GGT1, available from Ametek Aerospace Products, Inc. The turbine speed vs. fluid flowrate characteristics of the conventional swifter ball type flowmeter were measured at two different ambient temperatures. The measured characteristics are shown graphically in FIG. 8. The turbine speed vs. fluid flowrate characteristics of flowmeter 10 of FIG. 1 at an ambient temperature of 70° F. were also measured. FIG. 9 is graphical plot of the measured flowrate vs. turbine characteristics of flowmeter 10. As can be seen from the data shown in FIGS. 8 and 9, the turbine speed vs. fluid flowrate characteristics of flowmeter 10 are significantly more linear than those of the conventional swirler ball type flowmeter, particularly at low flowrates (i.e., less than one thousand PPH).

Thus, it is evident that there has been provided a fluid flowmeter that fully satisfies both the aims and objectives hereinbefore set forth. Many modifications of the above-described preferred embodiment is possible without departing from the present invention. Therefore, it is intended that the subject invention be viewed broadly to encompass all such modifications, and the present invention be defined only by the hereinafter appended claims.

What is claimed is:

1. A fluid flowmeter, and comprising, a turbine for imparting an angular momentum to a main flow of fluid that is related to a flow of fluid through said turbine, an impeller for undergoing an angular deflection in response to said angular momentum of said main flow, said angular deflection being indicative of flowrate of said main flow, a viscous shroud surrounding said impeller and having at least one opening, and a poppet valve for opening substantially as a function of pressure of said main flow to provide a bypass flow of fluid, through said at least one opening, the flow of fluid through said turbine being at most equal to said main flow reduced by said bypass flow, said valve being adapted such that said bypass flow varies so as to ensure that the flow through said turbine maintains substantially constant rotational speed of said turbine independent of flowrate of said main flow, said valve including a member for reciprocating relative to said opening whereby to control said bypass flow through said at least one opening.

2. A flowmeter according to claim 1, wherein said turbine includes a cylindrical member having a circumference and at least one orifice for permitting the flow of fluid through said turbine to exit said turbine tangentially to said circumference.

3. A flowmeter according to claim 1, wherein said viscous shroud is attached to said turbine.

4. A flowmeter according to claim 3, wherein said flowmeter further comprises a fluid containment housing, and said shroud includes at least one pressure relief hole adapted for causing leakage flow between said shroud and said fluid containment housing to be substantially proportional to said main flow.

5. A flowmeter according to claim 1, wherein said impeller is mounted to a shaft and includes a plurality of vanes oriented parallel to said shaft and attached to a restraining spring wound around said shaft.

6. A flowmeter according to claim 1, wherein said member is an annular member mounted to said viscous shroud, and said annular member is attached to a compression spring for urging said annular member into a closed position against the at least one opening in said shroud.

7. A flowmeter according to claim 6, wherein said impeller and shroud are mounted on a common shaft.

8. A flowmeter according to claim 6, wherein said spring includes two ends, one of said ends being attached to a spring stop mounted to a shroud and the other of said ends being attached to said annular member.

9. A flowmeter according to claim 1, and further comprising means for determining said flowrate of said main flow based upon angular deflection of said impeller.

10. A flowmeter according to claim 1, wherein said member is an an annular member slideably mounted to said viscous shroud, said annular member is attached to a compression spring for urging said annular member into a closed position against the at least one opening in shroud, said shroud including at least one groove for trapping contaminant particles from said fluid whereby to prevent said particles from hindering sliding of said annular member on said shroud.

11. A flowmeter according to claim 10, wherein said shroud includes a cylindrical portion and said at least one groove includes a plurality of grooves formed along a circumference of said cylindrical portion of said shroud.

12. A fluid flowmeter, and comprising, an impeller for undergoing an angular deflection in response to a flow of fluid having angular momentum in a passage between said impeller and a viscous shroud, said deflection of said impeller being related to flowrate of fluid in said passage, and a cylindrical turbine member attached to said viscous shroud and having at least two orifices for producing two respective flows of fluid in respective opposite directions tangential to an outer circumference of said cylindrical member so as to impart rotation to said cylindrical member and shroud, said respective flows being substantially perpendicular to a central axis of said turbine member, said rotation imparting said angular momentum to the flow of fluid in said passage, said two orifices being supplied with fluid via respective openings in said shroud, which openings communicate with respective passages in said cylindrical turbine.

13. A flowmeter according to claim 12, and further comprising a valve for reducing the flows of fluid through said orifices based upon the flow of fluid in said passage so as to keep rotational speed of said cylindrical turbine member and shroud substantially constant despite changes in flow of fluid in said passage.

14. A flowmeter according to claim 12, wherein said shroud includes at least one other opening, and said flowmeter further comprises at least one annular member and a compression spring adapted to urge said annular member into a closed position against said at least one other opening.

15. A flowmeter according to claim 13, wherein said valve is mounted to said shroud.

16. A flowmeter according to claim 12, and further comprising means for determining mass flowrate of fluid in said passage based upon angular deflection of said impeller.

17. A flowmeter according to claim 14, wherein said impeller, shroud, cylindrical member, and annular member are all coaxial.

18. A flowmeter according to claim 12, and further comprising variable reluctance means for measuring angular deflection of said impeller.

19. A flowmeter according to claim 1, and further comprising variable reluctance means for measuring angular deflection of said impeller.

20. A flowmeter according to claim 12, wherein said openings are positioned diametrically opposite to each other in an outer periphery of said shroud.

21. A flowmeter according to claim 12, wherein said cylindrical turbine member is downstream of said impeller and shroud.

22. A flowmeter according to claim 14, wherein said spring is adapted to cause the annular member to remain seated against said at least one other opening when fluid flowrate through said shroud is less than about 200 pph.

23. A flowmeter according to claim 14, wherein said at least one other opening comprises three other openings.

24. A flowmeter according to claim 1, wherein said at least one opening comprise three openings.

\* \* \* \* \*

UNITED STATES PATENT AND TRADEMARK OFFICE
CERTIFICATE OF CORRECTION

PATENT NO. : 5,728,950
DATED : March 17, 1998
INVENTOR(S) : Michael P. Boulanger It is certified that error appears in the above-identified patent and that said Letters Patent is hereby corrected as shown below:

On the title page: Item [54] and Column 1, line 1,

"FLUID FLOWMETER" should read
--A TURBINE FLOW METER FOR IMPARTING AN ANGULAR MOMENTUM--.

Claim 10, Col. 7, line 54, please delete "an" (second occurrence).

Claim 10, Col. 7, line 57, please insert --said-- before "shroud".

Signed and Sealed this

Tenth Day of November 1998

Attest:

BRUCE LEHMAN

Attesting Officer

Commissioner of Patents and Trademarks